(12) United States Patent
Yang et al.

(10) Patent No.: US 7,755,725 B2
(45) Date of Patent: Jul. 13, 2010

(54) TRANSFLECTIVE LIQUID CRYSTAL DISPLAY PANEL

(75) Inventors: Tun-Chun Yang, Hsin-Chu (TW); Chih-Jen Hu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 288 days.

(21) Appl. No.: 12/099,761

(22) Filed: Apr. 8, 2008

(65) Prior Publication Data
US 2009/0079887 A1 Mar. 26, 2009

(30) Foreign Application Priority Data
Sep. 26, 2007 (TW) .............................. 96135730 A (51) Int. Cl.
*G02F 1/1335* (2006.01)
*G02F 1/1343* (2006.01)
(52) U.S. Cl. ...................................... 349/114; 349/38
(58) Field of Classification Search ................... 349/38, 349/39, 43, 113, 114
See application file for complete search history.

(56) References Cited
U.S. PATENT DOCUMENTS 5,182,661 A * 1/1993 Ikeda et al. ................... 349/38
6,812,975 B2 * 11/2004 Nagahiro ..................... 349/39

2002/0033918 A1 * 3/2002 Shigeno et al. .............. 349/114
2004/0004221 A1 1/2004 Murade

FOREIGN PATENT DOCUMENTS

| CN | 1402065 A | 3/2003 |
|---|---|---|
| TW | 200705021 | 2/2007 |
| TW | 200719003 | 5/2007 |

\* cited by examiner

*Primary Examiner*—David Nelms
*Assistant Examiner*—David Y Chung
(74) *Attorney, Agent, or Firm*—Winston Hsu (57) ABSTRACT

A transflective liquid crystal display panel is disclosed. The liquid crystal display panel includes an array substrate and a storage capacitor disposed on the array substrate. The array substrate includes a transmitting region and a reflecting region, in which the storage capacitor is disposed on the reflecting region of the array substrate. The storage capacitor also includes a first transparent conducting layer disposed on the array substrate, a dielectric layer disposed on the first transparent conducting layer, and a reflective conducting layer disposed on the dielectric layer.

21 Claims, 7 Drawing Sheets

FIG. 7

TRANSFLECTIVE LIQUID CRYSTAL DISPLAY PANEL

This application claims priority to Taiwan Patent Application Serial Number 96135730, filed on Sep. 26, 2007, which is herein incorporated by reference.

RELATED APPLICATIONS

None

BACKGROUND OF THE INVENTION

1. Field of the Invention

The present invention relates to a liquid crystal display panel, and more particularly, to a transflective liquid crystal display panel.

2. Description of the Prior Art

By having characteristics of lightness, less radiation, and low power consumption, liquid crystal displays have gradually replaced conventional cathode ray tubes and become the dominant product in the display market. Typically, a liquid crystal display includes an array substrate, a color filter substrate, and a liquid crystal layer filled between the array substrate and the color filter substrate. The array substrate includes a plurality of pixels arranged in the manner of a matrix, in which each of the pixels is defined by a plurality of scan lines arranged horizontally and a plurality of data lines arranged vertically. Thin film transistors are used as switch elements for each pixel, and pixel electrodes are used to drive liquid crystals to adjust brightness of the pixels. Blue, green, and red color filters disposed on the color filter substrate are utilized to generate lights of different colors, thereby producing high quality color images. Depending on their source of lights, liquid crystal display panels are categorized into transmitting liquid crystal display panels, reflective liquid crystal display panels, and transflective liquid crystal display panels.

Figure 1:
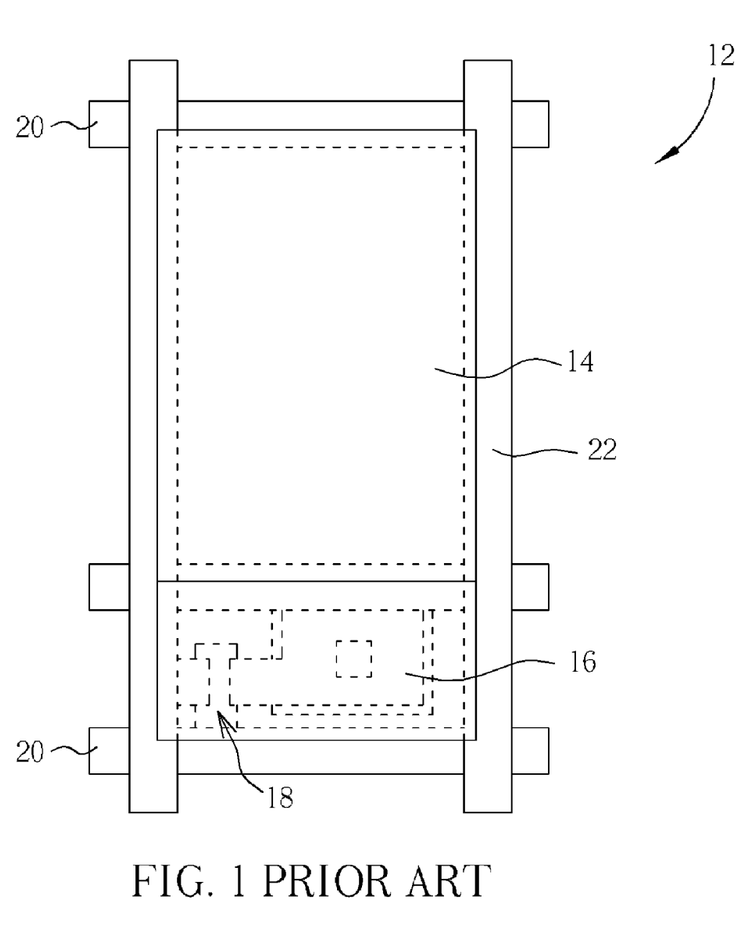
FIG. 1 illustrates a schematic view of a transflective liquid crystal display panel according to the prior art.

Referring to FIG. 1, FIG. 1 illustrates a schematic view of a transflective liquid crystal display panel according to the prior art. As shown in FIG. 1, the conventional transflective liquid crystal display panel includes at least a pixel 12 and a plurality of scan lines 20 and data lines 22 surrounding the pixel 12. The pixel 12 also includes a transmitting region 14, a capacitor region 16, and a transistor region 18, in which capacitors and thin film transistors are disposed in the capacitor region 16 and the transistor region 18 respectively.

It should be noted as the specification (such as contrast, viewing angle, response time, and NTSC values) of liquid crystal display advances, numerous metal structures are fabricated into the transistor and capacitor region of the display. This design not only raises the complexity of the display panel but also reduces its aperture ratio and results in lowered transmitting rate. Due to the nature of having both transmitting and reflecting mode, the reduction of the pixel area of a transflective liquid crystal display becomes much more difficult as the resolution of the display increases. This increases the proportion of non-transparent structures in the pixel region and affects the optical performance of the display panel significantly. If the aperture ratio of the display panel is increased by reducing the number of storage capacitors, problem such as electrical instability will result. Consequently, how to effectively increase the aperture ratio of a liquid crystal display pane has become an important task.

SUMMARY OF THE INVENTION

It is an objective of the present invention to provide a liquid crystal display panel for solving the aforementioned problems.

A liquid crystal display panel is disclosed. The liquid crystal display panel includes: an array substrate having a transmitting region and a reflecting region; and a storage capacitor disposed on the reflecting region of the array substrate, comprising: a common electrode disposed on the array substrate, a first dielectric layer disposed on the common electrode, a metal electrode disposed on the first dielectric layer, a second dielectric layer disposed on the metal electrode, and a first transparent conducting layer disposed on the second dielectric layer and electrically connected to the common electrode; a third dielectric layer disposed on the first transparent conducting layer; and a reflective conducting layer disposed on the third dielectric layer and electrically connected to the metal electrode.

A pixel structure for liquid crystal display is also disclosed. The pixel structure is fabricated on a substrate having a transmitting region and a reflecting region, in which the pixel structure comprises: a thin film transistor disposed on the reflecting region of the substrate; a stacked capacitor disposed on the reflecting region of the substrate, comprising: a first conductive layer, disposed on the reflecting region of the substrate; a first dielectric layer disposed on the first conductive layer; a second conductive layer disposed on the first dielectric layer and electrically connected to the thin film transistor; a second dielectric layer disposed on the second conductive layer; a third conductive layer disposed on the second dielectric layer and electrically connected to the first conductive layer; a third dielectric layer disposed on the third conductive layer; a reflective electrode disposed on the third dielectric layer on the reflecting region of the substrate and electrically connected to the second conductive layer; and a pixel electrode disposed on the transmitting region of the substrate and electrically connected to the thin film transistor.

The present invention uses the reflective electrode and the transparent conducting layer of the display panel to form a stacked capacitor that is connected in parallel. This design reduces the utilization of metal structures found in typical transflective display panels and thus increases the aperture ratio and transmitting rate of the display panel significantly. The present invention also fabricates a storage capacitor having a plurality of layers to maintain a sufficient level of capacity, and at the same time, uses the aforementioned dielectric material to optimize the stability and electrical performance of the display panel.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

First Embodiment

Figure 2:
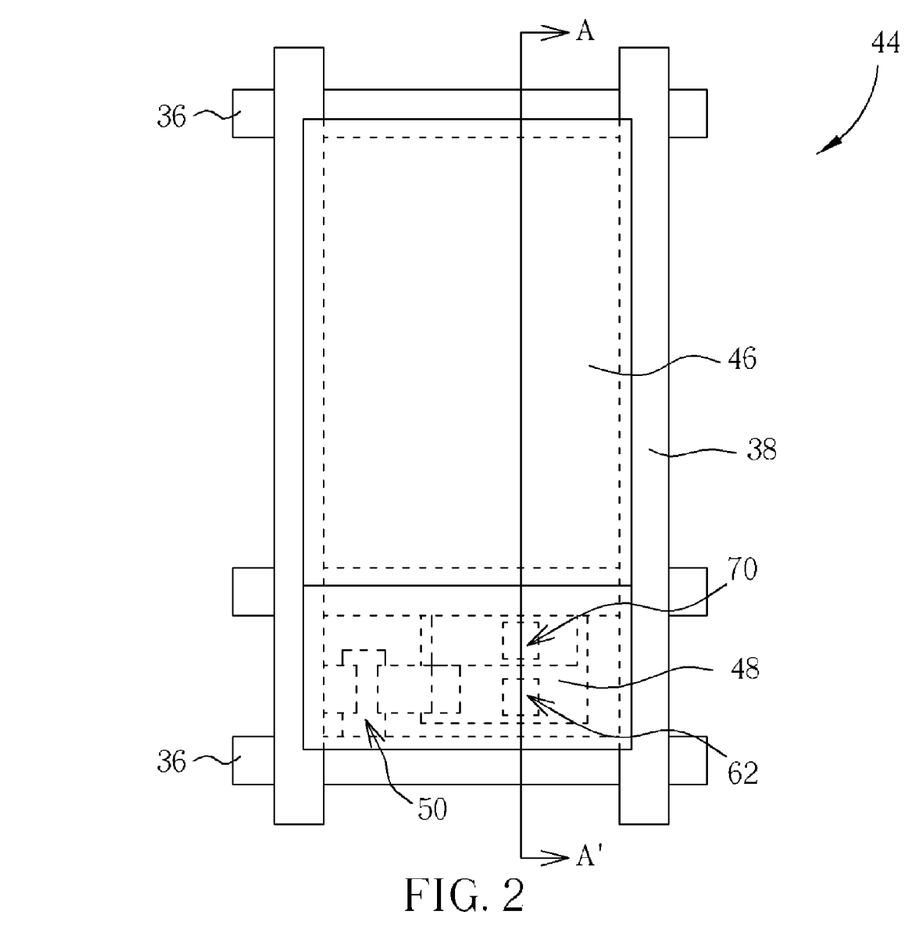
FIG. 2 illustrates a perspective view of utilizing an amorphous silicon process to fabricate a transflective liquid crystal display panel according a first embodiment of the present invention.
Figure 3:
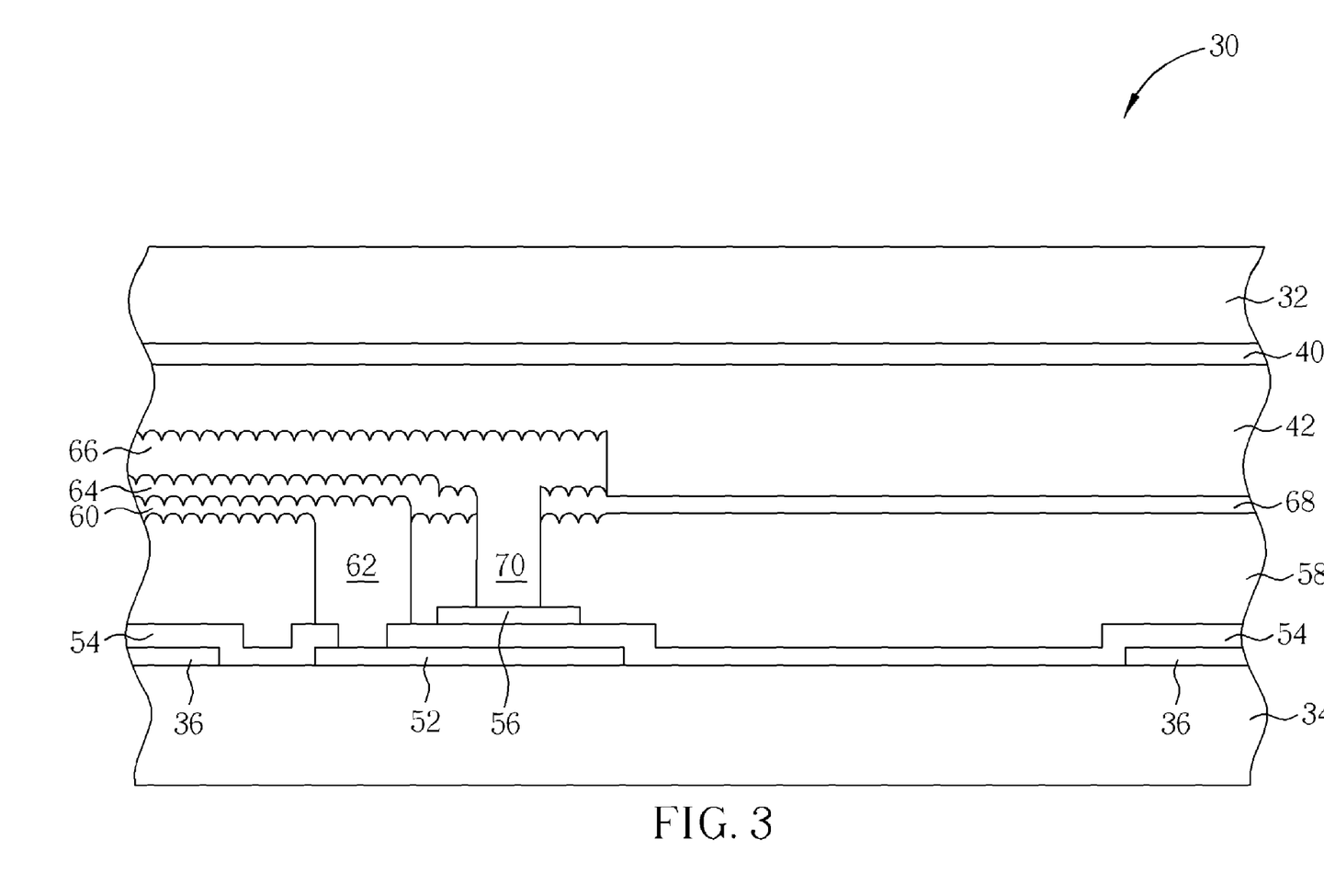
FIG. 3 illustrates a cross-sectional view of FIG. 2 along the sectional line AA'.

Referring to FIGS. 2-3, FIG. 2 illustrates a perspective view of utilizing an amorphous silicon process to fabricate a transflective liquid crystal display panel according a first embodiment of the present invention, and FIG. 3 illustrates a cross-sectional view of FIG. 2 along the sectional line AA'. The transflective liquid crystal display panel 30 includes a top substrate 32, a bottom substrate 34 (such as an array substrate 34) disposed opposite to the top substrate 32, a plurality of wires disposed on the array substrate 34, a color filter 40 disposed between the top substrate 32 and the array substrate 34, a liquid crystal layer 42 disposed between the top substrate 32 and the array substrate 34, and at least one pixel 44 electrically connected to the wires. The wires preferably includes a plurality of scan lines 36 and data lines 38, and the color filter 40 can be disposed on the top substrate 32 to form a color filter substrate, or disposed on the array substrate 34 to form a color filter on array (COA) substrate, which are all within the scope of the present invention.

Preferably, the pixel 44 has a transmitting region 46 and a reflecting region 48. The pixel 44 also includes a thin film transistor 50 (such as a bottom gate thin film transistor), a conductive layer 52 disposed on the reflecting region 48 of the array substrate 34, a dielectric layer 54 disposed on the conductive layer 52, a conductive layer 56 disposed on the dielectric layer 54 over the conductive layer 52, a dielectric layer 58 disposed on the conductive layer 56 and the dielectric layer 54, a conductive layer 60 disposed on the dielectric layer 58 and electrically connected to the conductive layer 52, a dielectric layer 64 disposed on the conductive layer 60, a reflective electrode 66 disposed on the dielectric layer 64 of the reflecting region 48 and a pixel electrode 68 disposed on the transmitting region 46 and electrically connected to the thin film transistor 50. The reflective electrode 66 is electrically connected to the conductive layer 56, which is further connected to the thin film transistor 50 to drive the liquid crystal molecules within the liquid crystal layer 42. Preferably, the pixel electrode 68 is electrically connected to the reflective electrode 66 to be further connected to the thin film transistor 50.

The conductive layer 52, the dielectric layer 54, and the conductive layer 56 can be used to form a storage capacitor, and the conductive layer 60, the dielectric layer 64, and the reflective electrode 66 can be used to form another storage capacitor. In other words, according to the preferred embodiment of the present invention, the conductive layer 52, the dielectric layer 54, the conductive layer 56, the dielectric layer 58, the conductive layer 60, the dielectric layer 64, and the reflective electrode 66 can be used to form a stacked capacitor connected in a parallel manner. Additionally, the conductive layer 60 is electrically connected to the conductive layer 52 through a via hole or a conductive plug 62, which is further connected to a common voltage source (not shown) of a common electrode. The reflective electrode 66 is electrically connected to the conductive layer 56 through another conductive plug 70. The conductive layers 52 and 60 electrically connected to the common electrode (not shown) have a first potential, whereas the conductive layer 56 and the reflective electrode 66 electrically connected to the thin film transistor 50 have a second potential.

According to an embodiment of the present invention, the dielectric layers 54, 58, 64 can be composed of oxides, silicon oxides, silicon nitrides, silicon oxynitrides, organic materials, inorganic materials, or combination thereof, and the conductive layer 60, the conductive plug 62, and the pixel electrode 68 can be composed of transparent conducting material such as indium tin oxide (ITO) or indium zinc oxide (IZO).

It should be noted that the present invention specifically uses the reflective electrode and the transparent conducting layer to form a stacked capacitor that is connected in parallel. This design reduces the utilization of metal structures found in typical transflective display panels and increases the aperture ratio and transmitting rate of the display panel significantly. The present invention also fabricates a storage capacitor having a plurality of layers to maintain a sufficient level of capacity and at the same time, uses the aforementioned dielectric material to optimize the stability and electrical performance of the display panel.

Second Embodiment

Figure 4:
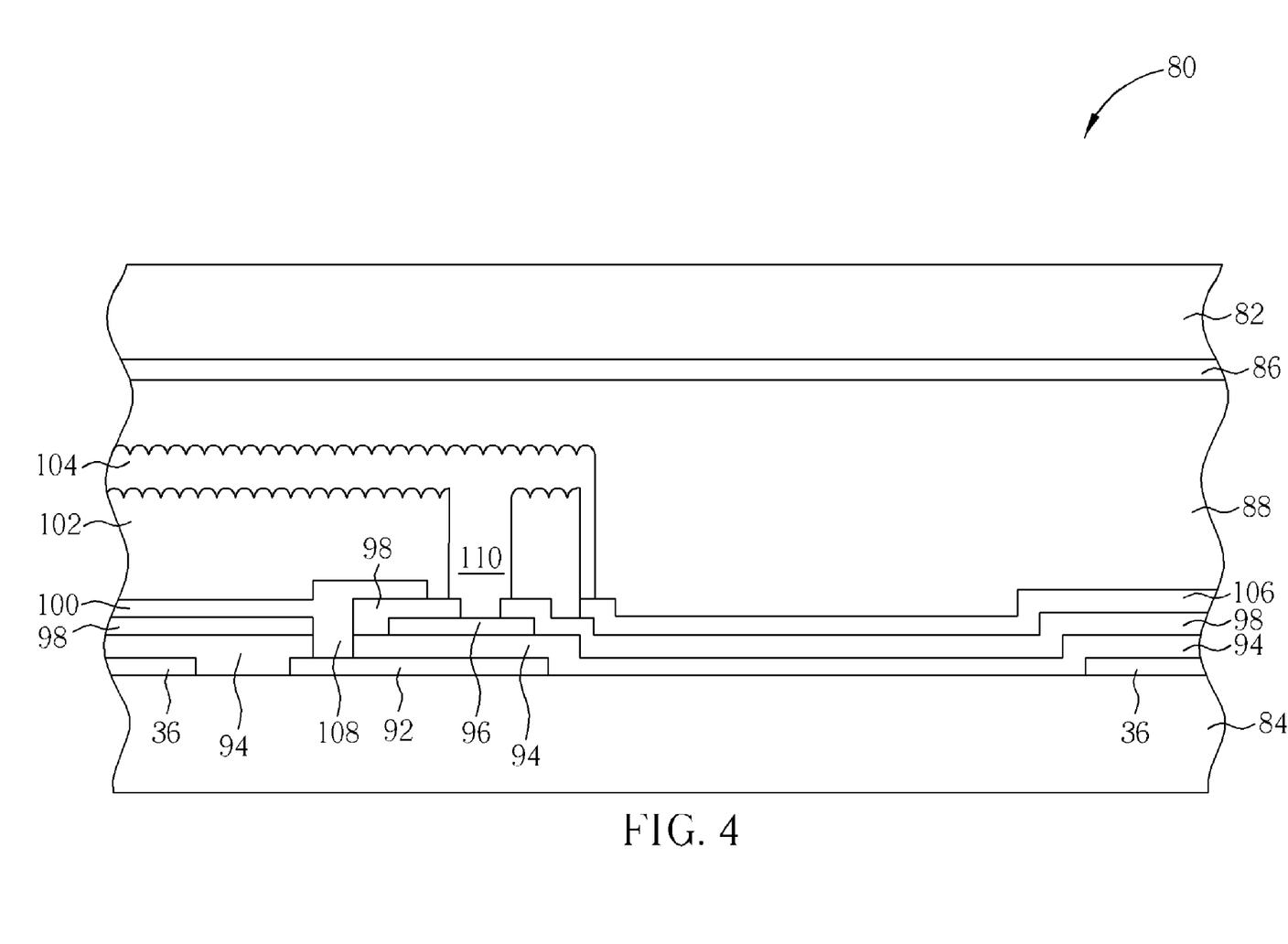
FIG. 4 illustrates a cross-sectional view of using an amorphous silicon process to fabricate a transflective liquid crystal display panel according to a second embodiment of the present invention.

Referring to FIG. 4, FIG. 4 illustrates a cross-sectional view of using an amorphous silicon process to fabricate a transflective liquid crystal display panel according to a second embodiment of the present invention. As shown in FIG. 4, the transflective liquid crystal display panel 80 includes a top substrate 82, a bottom substrate 84 (such as an array substrate 84) disposed opposite to the top substrate 82, a color filter 86 disposed between the top substrate 82 and the array substrate 84, and a liquid crystal layer 88 disposed between the top substrate 82 and the array substrate 84.

The transflective liquid crystal display panel 80 also includes a conductive layer 92 disposed on the array substrate 84, a dielectric layer 94 disposed on the conductive layer 92, a conductive layer 96 disposed on the dielectric layer 94 over the conductive layer 92 and electrically connected to a thin film transistor (not shown), a dielectric layer 98 disposed on the conductive layer 96 and the dielectric layer 94, a conductive layer 100 disposed on the dielectric layer 98 and electrically connected to the conductive layer 92, a dielectric layer 102 disposed on the conductive layer 100, a reflective electrode 104 disposed on the dielectric layer 102 and electrically connected to the conductive layer 96, and a pixel electrode 106 disposed on the dielectric layer 98 of the transmitting region and electrically connected to the thin film transistor.

In this embodiment, the conductive layer 92, the dielectric layer 94, and the conductive layer 96 can be used to form a storage capacitor, the conductive layer 96, the dielectric layer 98, and the conductive layer 100 can be used to form a storage capacitor, and the conductive layer 100, the dielectric layer 102, and the reflective electrode 104 can be used to form a storage electrode. In other words, the conductive layer 92, the dielectric layer 94, the conductive layer 96, the dielectric layer 98, the conductive layer 100, the dielectric layer 102, and the reflective electrode 104 can be used to form a stacked capacitor, in which the stacked capacitor is connected in a parallel manner. Additionally, the conductive layer 100 is electrically connected to the conductive layer 92 through a conductive plug 108, which is further connected to a common voltage source (not shown). The reflective electrode 104 is electrically connected to the conductive layer 96 through another conductive plug 110.

Similar to the first embodiment of the present invention, the dielectric layers 94, 98, 102 can be composed of oxides, silicon oxides, silicon nitrides, silicon oxynitrides, organic materials, inorganic materials, or combination thereof, and the conductive layer 100, the conductive plug 108, and the pixel electrode 106 can be composed of transparent conducting material such as indium tin oxide (ITO) or indium zinc oxide (IZO).

Third Embodiment

Figure 5:
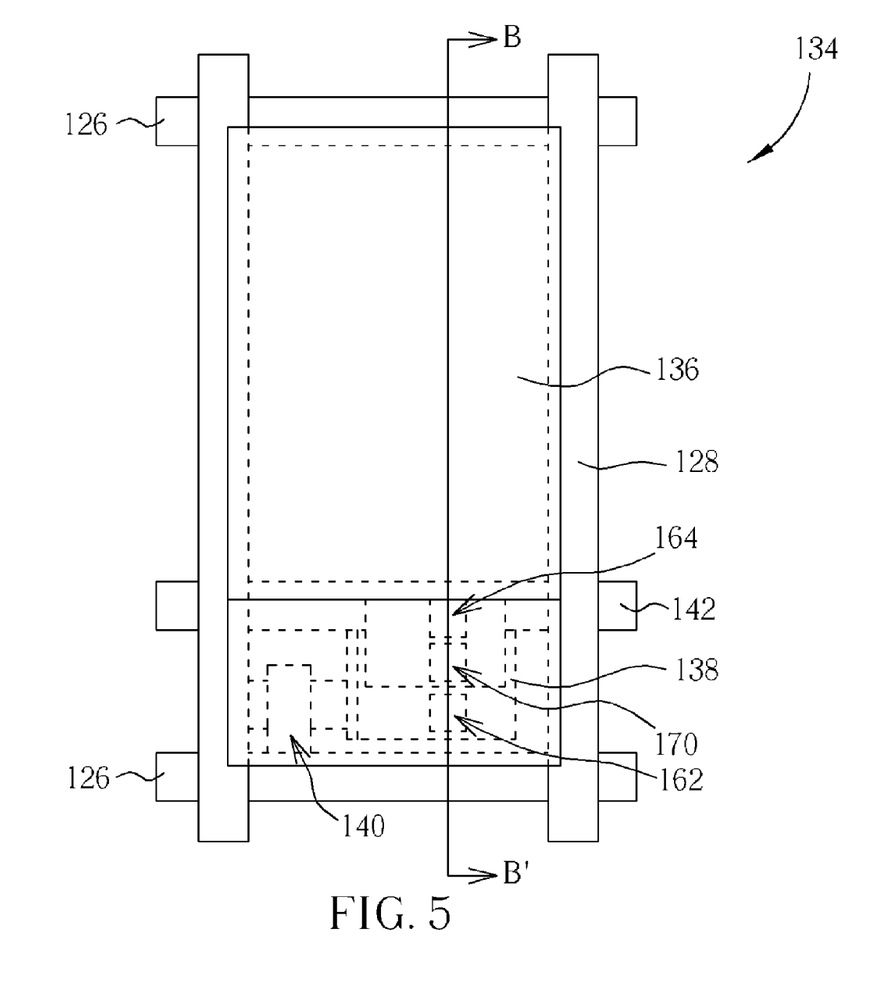
FIG. 5 illustrates a perspective view of utilizing a low temperature polysilicon process to fabricate a transflective liquid crystal display panel according to a third embodiment of the present invention.
Figure 6:
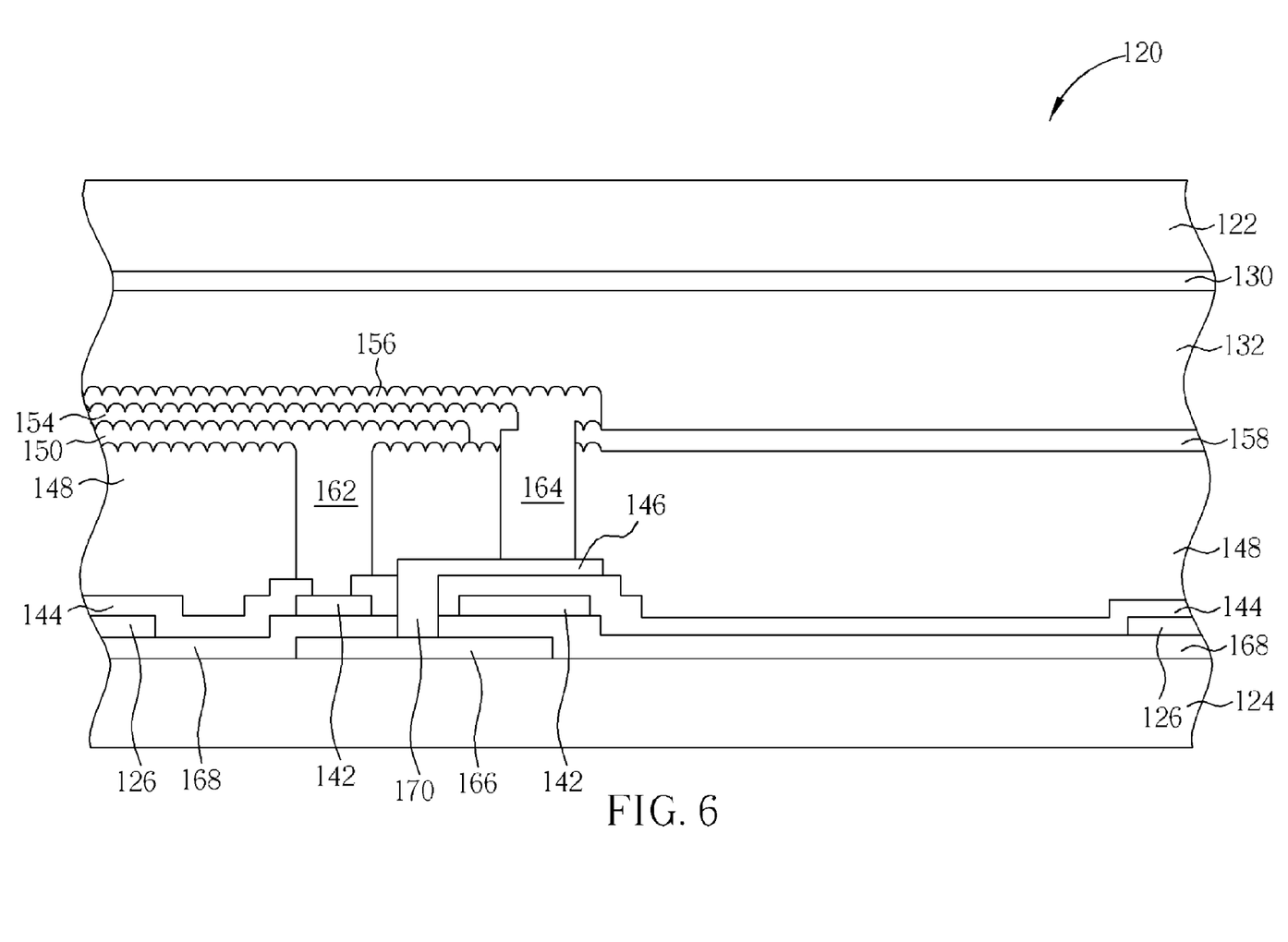
FIG. 6 illustrates a cross-sectional view of FIG. 5 along the sectional line BB'.

Referring to FIGS. 5-6, FIG. 5 illustrates a perspective view of utilizing a low temperature polysilicon process to fabricate a transflective liquid crystal display panel 120 according to a third embodiment of the present invention, and FIG. 6 illustrates a cross-sectional view of FIG. 5 along the sectional line BB'. The transflective liquid crystal display panel 120 includes a top substrate 122, a bottom substrate 124 (such as an array substrate 124) disposed opposite to the top substrate 122, a plurality of wires disposed on the array substrate 124, a color filter 130 disposed between the top substrate 122 an the array substrate 124, a liquid crystal layer 132 disposed between the top substrate 122 and the array substrate 124, and at least one pixel 134 electrically connected to the wires. The wires preferably includes a plurality of scan lines 126 and data lines 128, and the color filter 130 can be disposed on the top substrate 122 to form a color filter substrate, or disposed on the array substrate 124 to form a color filter on array (COA) substrate, which are all within the scope of the present invention.

The pixel 134 includes a transmitting region 136 and a reflecting region 138. The pixel 134 also includes a thin film transistor 140 (such as a top gate thin film transistor) fabricated by a low temperature polysilicon process, a semiconductor layer 166 electrically connected to the thin film transistor 140 and disposed on the array substrate 124 of the reflecting region 138, a dielectric layer 168 disposed on the semiconductor layer 166 and the array substrate 124, a conductive layer 142 disposed on the dielectric layer 168 of the reflecting region 138, a dielectric layer 144 disposed on the conductive layer 142 and the dielectric layer 168, a conductive layer 146 disposed on the dielectric layer 144 over the conductive layer 142 and electrically connected to the thin film transistor 140, a dielectric layer 148 disposed on the conductive layer 146 and the dielectric layer 144, a conductive layer 150 disposed on the dielectric layer 148 of the reflecting region 138 and electrically connected to the conductive layer 142, a dielectric layer 154 disposed on the conductive layer 150, a reflective electrode 156 disposed on the dielectric layer 154 and electrically connected to the conductive layer 146, and a pixel electrode 158 disposed on the transmitting region 136 and electrically connected to the thin film transistor 140.

By utilizing a low temperature polysilicon process to fabricate a display panel, this embodiment would need to form an additional semiconductor layer 166 and dielectric layer 168 on the array substrate. Typically, the semiconductor layer 166 is formed corresponding to the polysilicon layer of the low temperature polysilicon thin film transistor 140 disposed on the transistor region, and the dielectric layer 168 is formed corresponding to the gate dielectric layer (not shown) of the thin film transistor 140.

Preferably, the semiconductor layer 166, the dielectric layer 168, and the conductive layer 142 can be used to form a storage capacitor, the conductive layer 142, the dielectric layer 144, and the conductive layer 146 can be used to form a storage capacitor, the conductive layer 146, the dielectric layer 148, and the conductive layer 150 can be used to form a storage capacitor, and the conductive layer 150, the dielectric layer 154, and the reflective electrode 156 can be used to form another storage capacitor. In other words, the semiconductor layer 166, the dielectric layer 168, the conductive layer 142, the dielectric layer 144, the conductive layer 146, the dielectric layer 148, the conductive layer 150, the dielectric layer 154, and the reflective electrode 156 can be used to form a stacked capacitor connected in a parallel manner. Additionally, the conductive layer 146 is electrically connected to the semiconductor layer 166 through a conductive plug 170, the conductive layer 150 is electrically connected to the conductive layer 142 through a conductive plug 162, and the reflective electrode 156 is electrically connected to the conductive layer 146 through another conductive plug 164. The conductive layers 142 and 150 electrically connected to a common electrode (not shown) have a first potential, whereas the conductive layer 146 and the reflective electrode 156 electrically connected to the thin film transistor 140 have a second potential.

According to an embodiment of the present invention, the dielectric layers 144, 148, 154, 168 can be composed of oxides, silicon oxides, silicon nitrides, silicon oxynitrides, organic materials, inorganic materials, or combination thereof, and the conductive layer 150, the conductive plug 162, and the pixel electrode 158 can be composed of transparent conducting material such as indium tin oxide (ITO) or indium zinc oxide (IZO).

Fourth Embodiment

Figure 7:
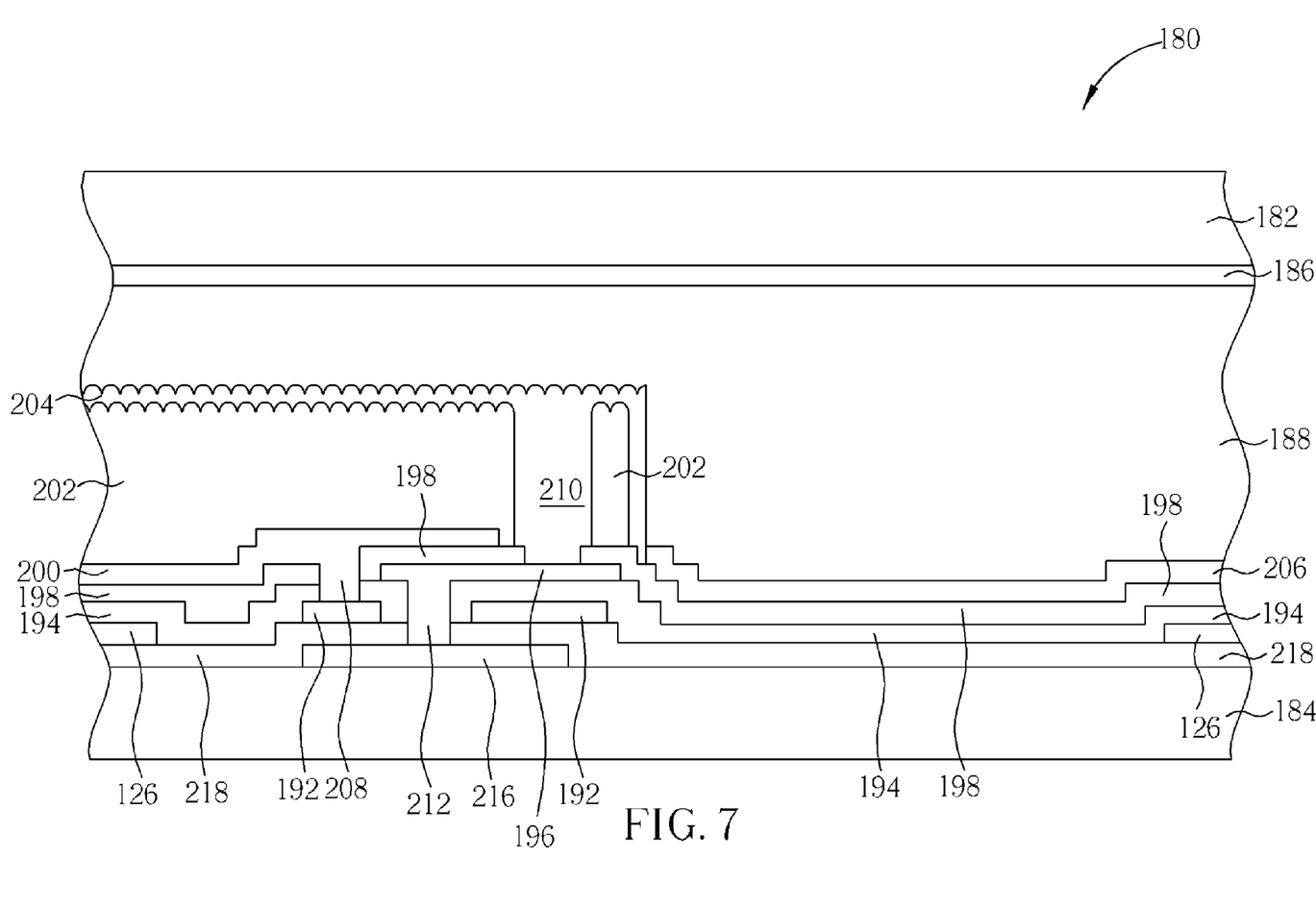
FIG. 7 illustrates a cross-sectional view of using a low temperature polysilicon process to fabricate a transflective liquid crystal display panel according to a fourth embodiment of the present invention.

Referring to FIG. 7, FIG. 7 illustrates a cross-sectional view of using a low temperature polysilicon process to fabricate a transflective liquid crystal display panel according to a fourth embodiment of the present invention. As shown in FIG. 7, the transflective liquid crystal display panel 180 includes a top substrate 182, a bottom substrate 184 (such as an array substrate 184) disposed opposite to the top substrate 182, a color filter 186 disposed between the top substrate 182 and the array substrate 184, and a liquid crystal layer 188 disposed between the top substrate 182 and the array substrate 184.

The transflective liquid crystal display panel 180 also includes a semiconductor layer 216 disposed on the array substrate 184, a dielectric layer 218 disposed on the semiconductor layer 216 and the array substrate 184, a conductive layer 192 disposed on the dielectric layer 218, a dielectric layer 194 disposed on the conductive layer 192 and the dielectric layer 218, a conductive layer 196 disposed on the dielectric layer 194 over the conductive layer 192 and electrically connected to a thin film transistor (not shown), a dielectric layer 198 disposed on the conductive layer 196 and the dielectric layer 194, a conductive layer 200 disposed on the dielectric layer 198 and electrically connected to the conductive layer 192, a dielectric layer 202 disposed on the conductive layer 200, a reflective electrode 204 disposed on the dielectric layer 202 and electrically connected to the conductive layer 196, and a pixel electrode 206 disposed on the dielectric layer 198 of the transmitting region and electrically connected to the thin film transistor.

Similar to the third embodiment of the present invention, by using a low temperature polysilicon process to fabricate a display panel, the present embodiment would have an additional semiconductor layer 216 and dielectric layer 218 disposed on the array substrate 184. Moreover, the semiconductor layer 216 is formed corresponding to the polysilicon layer of the low temperature polysilicon thin film transistor 140 disposed on the transistor region, and the dielectric layer 218 is formed corresponding to the gate dielectric layer (not shown) of the thin film transistor.

Preferably, the semiconductor layer 216, the dielectric layer 218, and the conductive layer 192 can be used to form a storage capacitor, the conductive layer 192, the dielectric layer 194, and the conductive layer 196 can be used to form a storage capacitor, the conductive layer 196, the dielectric layer 198, and the conductive layer 200 can be used to form a storage capacitor, and the conductive layer 200, the dielectric layer 202, and the reflective electrode 204 can be used to form another storage capacitor. In other words, the semiconductor layer 216, the dielectric layer 218, the conductive layer 192, the dielectric layer 194, the conductive layer 196, the dielectric layer 198, the conductive layer 200, the dielectric layer 202, and the reflective electrode 204 can be utilized to form a stacked capacitor. Additionally, the conductive layer 196 is electrically connected to the semiconductor layer 216 through a conductive plug 212, the conductive layer 200 is electrically connected to the conductive layer 192 through a conductive plug 208, and the reflective electrode 204 is electrically connected to the conductive layer 196 through another conductive plug 210.

Overall, the present invention uses the reflective electrode and the transparent conducting layer of the display panel to form a stacked capacitor that is connected in parallel. This design reduces the utilization of metal structures found in typical transflective display panels and thus increases the aperture ratio and transmitting rate of the display panel significantly. The present invention also fabricates a storage capacitor having a plurality of layers to maintain a sufficient level of capacity, and at the same time, the present invention uses the aforementioned dielectric material to optimize the stability and electrical performance of the display panel.

Those skilled in the art will readily observe that numerous modifications and alterations of the device and method may be made without departing from the principles and spirit of the present invention, the scope of which is defined in the appended claims and their equivalents.

What is claimed is:

1. A liquid crystal display panel, comprising:
   an array substrate having a transmitting region and a reflecting region;
   a storage capacitor disposed on the reflecting region of the array substrate, comprising:
      a common electrode disposed on the array substrate;
      a first dielectric layer disposed on the common electrode;
      a metal electrode disposed on the first dielectric layer;
      a second dielectric layer disposed on the metal electrode;
      a first transparent conducting layer disposed on the second dielectric layer and electrically connected to the common electrode;
      a third dielectric layer disposed on the first transparent conducting layer; and
      a reflective conducting layer disposed on the third dielectric layer and electrically connected to the metal electrode.

2. The liquid crystal display panel of claim 1, wherein the metal electrode is electrically connected to a thin film transistor.

3. The liquid crystal display panel of claim 1, wherein a material of the first dielectric layer, the second dielectric layer, and the third dielectric layer comprises oxides, silicon oxides, silicon nitrides, silicon oxynitrides, or a combination thereof.

4. The liquid crystal display panel of claim 1, wherein a material of the first dielectric layer, the second dielectric layer, and the third dielectric layer comprises organic material, inorganic material, or a combination thereof.

5. The liquid crystal display panel of claim 1, wherein the first transparent conducting layer comprises an indium tin oxide layer or an indium zinc oxide layer.

6. The liquid crystal display panel of claim 1, further comprising a second transparent conducting layer disposed on the transmitting region of the array substrate.

7. The liquid crystal display panel of claim 6, wherein the second transparent conducting layer comprises an indium tin oxide layer or an indium zinc oxide layer.

8. The liquid crystal display panel of claim 6, wherein the second transparent conducting layer is a pixel electrode.

9. The liquid crystal display panel of claim 6, wherein the second transparent conducting layer is connected to the reflective conducting layer.

10. A pixel structure for liquid crystal display, wherein the pixel structure is fabricated on a substrate having a transmitting region and a reflecting region, the pixel structure comprising:
   a thin film transistor disposed on the reflecting region of the substrate;
   a stacked capacitor disposed on the reflecting region of the substrate, comprising:
      a first conductive layer, disposed on the reflecting region of the substrate;
      a first dielectric layer disposed on the first conductive layer;
      a second conductive layer disposed on the first dielectric layer and electrically connected to the thin film transistor;
      a second dielectric layer disposed on the second conductive layer;
      a third conductive layer disposed on the second dielectric layer and electrically connected to the first conductive layer; and
      a third dielectric layer disposed on the third conductive layer;
   a reflective electrode disposed on the third dielectric layer on the reflecting region of the substrate, and electrically connected to the second conductive layer; and
   a pixel electrode disposed on the transmitting region of the substrate and electrically connected to the thin film transistor.

11. The pixel structure of claim 10, wherein a material of the first dielectric layer, the second dielectric layer, and the third dielectric layer comprises oxides, silicon oxides, silicon nitrides, silicon oxynitrides, or a combination thereof.

12. The pixel structure of claim 10, wherein a material of the first dielectric layer, the second dielectric layer, and the third dielectric layer comprise organic material, inorganic material, or a combination thereof.

13. The pixel structure of claim 10, wherein the third conductive layer comprises an indium tin oxide layer or an indium zinc oxide layer.

14. The pixel structure of claim 10, wherein the pixel electrode comprises an indium tin oxide layer or an indium zinc oxide layer.

15. A liquid crystal display array substrate, comprising:
a substrate having a plurality of pixel structures thereon, each of the pixel structures comprises a transmitting region and a reflecting region, each pixel structure comprising:
a thin film transistor disposed on the reflecting region of the substrate;
a stacked capacitor disposed on the reflecting region of the substrate, comprising:
  a first conductive layer disposed on the reflecting region of the substrate;
  a first dielectric layer disposed on the first conductive layer;
  a second conductive layer disposed on the first dielectric layer and electrically connected to the thin film transistor;
  a second dielectric layer disposed on the second conductive layer;
  a third conductive layer disposed on the second dielectric layer and electrically connected to the first conductive layer; and
  a third dielectric layer disposed on the third conductive layer;
a reflective electrode disposed on the third dielectric layer on the reflecting region of the substrate, and electrically connected to the second conductive layer; and
a pixel electrode disposed on the transmitting region of the substrate and electrically connected to the thin film transistor.

16. The liquid crystal display array substrate of claim 15, wherein a material of the first dielectric layer, the second dielectric layer, and the third dielectric layer comprises oxides, silicon oxides, silicon nitrides, silicon oxynitrides, or a combination thereof.

17. The liquid crystal display array substrate of claim 15, wherein a material of the first dielectric layer, the second dielectric layer, and the third dielectric layer comprises organic material, inorganic material, or a combination thereof.

18. The liquid crystal display array substrate of claim 15, wherein the third conductive layer comprises an indium tin oxide layer or an indium zinc oxide layer.

19. The liquid crystal display array substrate of claim 15, wherein the pixel electrode comprises an indium tin oxide layer or an indium zinc oxide layer.

20. The liquid crystal display array substrate of claim 15, wherein the thin film transistor comprises a gate dielectric layer, wherein the gate dielectric layer is disposed on the same level as the first dielectric layer.

21. The liquid crystal display array substrate of claim 15 further comprising a semiconductor layer and another dielectric layer disposed between the first conductive layer and the substrate.

* * * * *